ABSTRACT# United States Patent [19]

Bucholz

[11] Patent Number: 4,986,023

[45] Date of Patent: Jan. 22, 1991

[54] LINE TIE

[75] Inventor: Frederick S. Bucholz, Omaha, Nebr.

[73] Assignee: Plastilite Corporation, Omaha, Nebr.

[21] Appl. No.: 501,467

[22] Filed: Mar. 30, 1990

[51] Int. Cl.$^5$ .............................................. A01K 91/00
[52] U.S. Cl. .................................... 43/44.87; 43/44.9;
24/537; 24/115 R
[58] Field of Search ................ 43/44.87, 44.91, 44.92,
43/44.95; 24/129 R, 537, 115 R; 16/202, 206,
207

[56] References Cited

U.S. PATENT DOCUMENTS

| 113,313 | 4/1871 | Linsey | 24/537 |
|---|---|---|---|
| 1,296,674 | 3/1919 | Lindsay | 24/537 |
| 2,587,311 | 2/1952 | Golnick | 43/44.87 |
| 2,890,510 | 6/1959 | Spalding | 43/44.93 |
| 3,161,983 | 12/1964 | Stanek | 43/44.87 |
| 3,800,459 | 4/1974 | Fleischaker | 43/44.9 |
| 4,566,157 | 1/1986 | Packendorff | 24/537 |

FOREIGN PATENT DOCUMENTS 123444 8/1947 Australia ............................... 24/537

Primary Examiner—Richard K. Seidel
Assistant Examiner—Chuck Y. Mah
Attorney, Agent, or Firm—Henderson & Sturm

[57] ABSTRACT

A line tie including a top portion and a base connected to an attached member, such as a fishing float. The top portion includes a J-shaped axial slot that extends down from the top portion. Three axially spaced annular grooves are formed in the periphery of the top portion. The topmost groove is positioned above the closed end of the J-slot, the next groove is positioned to intersect the upwardly directed leg of the J-slot, and the lowermost groove is positioned below the J-slot. A rubber O-ring is selectively received in one of the annular grooves. To secure a line to the attached member the O-ring is positioned in the lowermost line-loading groove and a section of line is inserted in the J-slot and moved to the upwardly directed leg. The O-ring is then moved up to the intermediate slip groove or to the topmost set groove. To release the line from the line tie, the O-ring is moved to the lowermost groove and the section of line is moved up out of the J-slot.

10 Claims, 1 Drawing Sheet

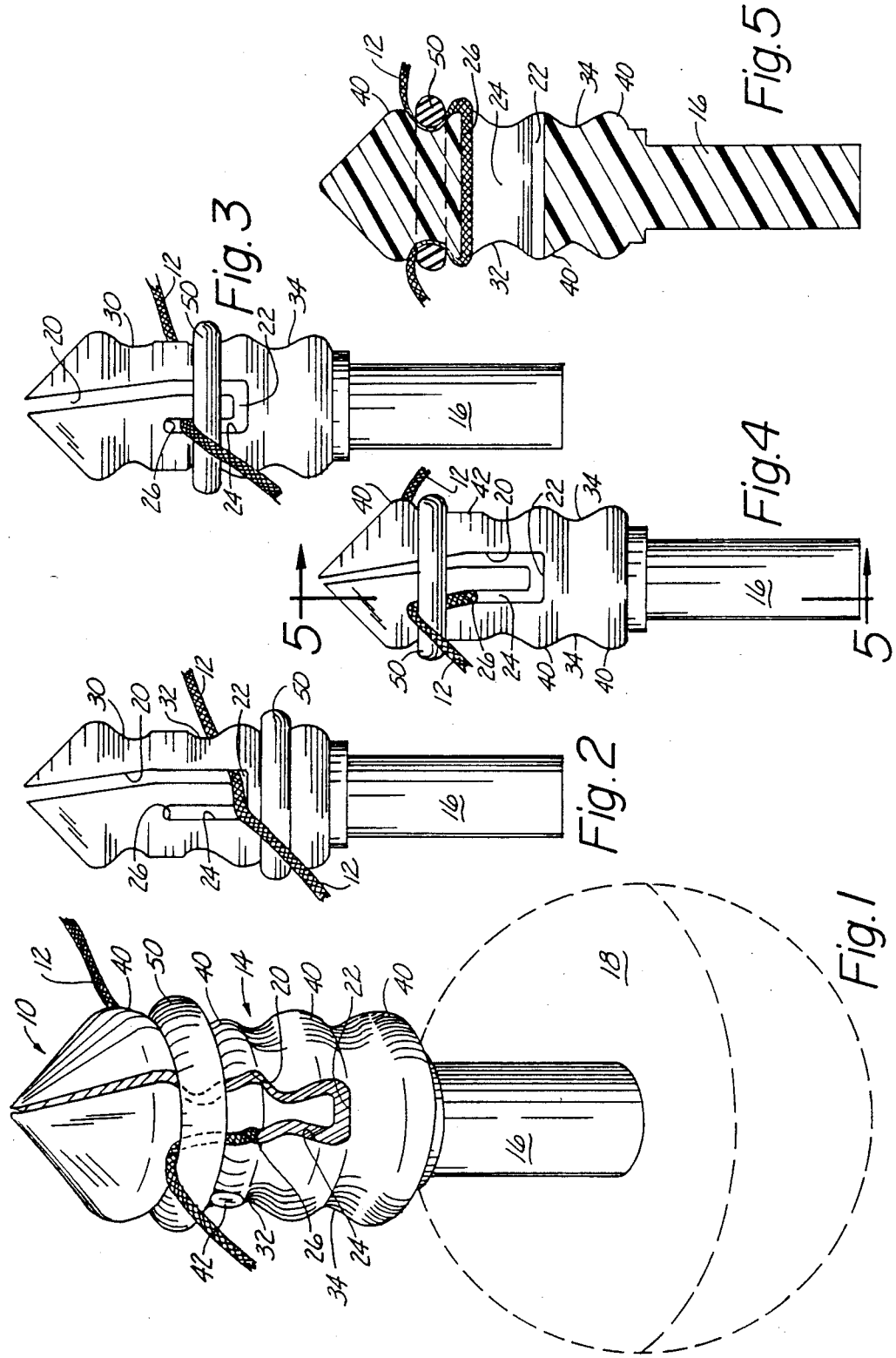

4,986,023

LINE TIE

TECHNICAL FIELD

This invention relates to a line tie, and more particularly to a line tie for an attached member, such as a fishing float.

BACKGROUND ART

As is known, with some types of fishing, such as in casting a fishing line into a body of water, it is frequently desirable to be able to position a hook on the line at a certain level above the bottom. Various types of floats have been known which can be secured onto a fishing line at predetermined locations so that when cast into the water, the float will support the hook above the bottom.

Floats which have been used are of the set-type or of the slip-type. The set-type of float is one which is usually fixed to a fishing line for use at shallow depths. One known set-type float has a body provided with a spring biased hook at one or both ends which can be drawn into a recess of the body in order to clamp a fishing line between the hook and body of the float. Other known set-type floats are of similar construction. In each case, the float is fixed to the line and is not intended to move during use. However, these floats usually have a short useful life due to corrosion or breakage of the moving parts. Further, these floats require complex manufacturing and assembling techniques.

It is impractical for a set float to be used at depths of 10 feet or 15 feet, since it would be virtually impossible to cast with a standard spinning pole. Thus, a slip float must be used.

Slip-type floats are generally formed on a float body with a central bore. The fishing line is first threaded through the float body and then one or more hooks and a sinker are applied to the end of the line. During use, a slip foat is able to slide along the fishing line until abutting a loop knot in the line which acts as a stop past which the float will not pass. In the event that the float requires removal, the line is usually cut at a point above the usual tackle and a rethreading of a new float made on the line.

In some cases, small plastic floats have been threaded onto fishing lines to act as slip floats. However, when dirt becomes entrained within the floats, the floats jam on the fishing line causing the hook to be positioned at a shallower depth than intended.

Known floats which can be removed from a line include a float made of two parts hinged together to sandwich a fishing line between the parts when closed. Other floats have been made of two pieces which can dove-tail together in a slide fit relation to clamp onto a line.

Certain stick floats are known that include a spring that extends over a slotted side opening that receives a section of line. The spring, however, abrades the line and frequently is caught in the side slot.

Those concerned with these and other problems recognize the need for an improved line tie.

DISCLOSURE OF THE INVENTION

The present invention provides a line tie including a top portion and a base connected to an attached member, such as a fishing float. The top portion includes a J-shaped axial slot that extends down from the top portion. Three axially spaced annular grooves are formed in the periphery of the top portion. The topmost groove is positioned above the closed end of the J-slot, the next groove is positioned to intersect the upwardly directed leg of the J-slot, and the lowermost groove is positioned below the J-slot. A rubber, or similar material, O-ring is selectively received in one of the annular grooves. To secure a line to the attached member the O-ring is positioned in the lowermost line-loading groove and a section of line is inserted in the J-slot and moved to the upwardly directed leg. The O-ring is then moved up to the intermediate slip groove or to the topmost set groove. To release the line from the line tie, the O-ring is moved to the lowermost groove and the section of line is moved up out of the J-slot.

An object of the present invention is the provision of an improved line tie.

Another object is to provide a line tie that allows the attached member to be readily attached to or removed from a line.

A further object of the invention is the provision of a line tie that conveniently allows a slip attachment or a set attachment of the line to the attached member.

Still another object is to provide a line tie that is convenient and easy to use.

A still further object of the present invention is the provision of a line tie that is uncomplicated in design and durable.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing a section of line secured to the line tie with the O-ring positioned in the topmost set groove restraining the line from movement, and showing the base connected to a dashed line illustration of an attached member such as a fishing float;

FIG. 2 is a side elevational view of the line tie showing the O-ring positioned in the lowermost line-loading groove, and showing the section of line received in the J-slot;

FIG. 3 is a side elevational view similar to FIG. 2, but showing the line in the upwardly directed securement section of the J-slot and showing the O-ring in the intermediate slip groove where the line is slidably attached to the line tie;

FIG. 4 is a side elevational view similar to FIGS. 2 and 3, but showing the line in contact with the closed end of the J-slot, and showing the O-ring in the topmost set groove where the line is secured against movement with respect to the line tie; and FIG. 5 is a sectional view taken along line 5—5 of FIG. 4 showing the securement of the line by the O-ring positioned in the set groove.

BEST MODE FOR CARRYING OUT THE INVENTION

Referring now to the drawings, wherein like reference numerals designate identical or corresponding parts throughout the several views, FIG. 1 shows the line tie (10) of the present invention securing a section of line (12). The line tie (10) includes a cylindrical body having a top portion (14) and a base (16). The base (16) can be made in various configurations suitable for connection to a variety of attached members, such as a fishing float (18).

The top portion (14) has a J-shaped axial slot including a downwardly directed line-loading section (20), a horizontal section (22), and an upwardly directed securement section (24) terminating in a closed end (26). A number of annular grooves are formed in the periphery of the top portion including the topmost set groove (30), the intermediate slip groove (32), and the lowermost line-loading groove (34). Rounded annular protrusions (40) separate the grooves (30, 32, 34). Also, a protrusion (40) is disposed above the set groove (30) and below the line-loading groove (34). A pair of opposing flats (42) is formed in the protrusion (40) separating the set groove (30) from the slip groove (32).

A resilient rubber, or similar material, O-ring (50) is selectively received in one of the grooves (30, 32, 34). It is to be understood that the ring (50) could be made of other resilient materials that would not snag the line (12) or be caught in any part of the J-slot.

In operation, the O-ring (50) is positioned in the line-loading groove (34), and a section of line (12) is placed into the J-slot and positioned in the upwardly directed securement section (24) as is illustrated in FIG. 2. The ring (50) is then moved to either the slip groove (32) as illustrated in FIG. 3, or the set groove (30) as illustrated in FIG. 4. When the line (12) is in the slip groove (32), the line (12) is slidably attached to the line tie (10) and the attached float (18). When the line (12) is in the set groove (30), the line (12) is "set" or secured against movement with respect to the line tie (10). To remove the attached float (18) from the line (12), the ring (50) is moved to the line-loading groove (34) (FIG. 2) and the line (12) is removed from the J-slot.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A line tie, comprising:
   a cylindrical body including a top portion and a base, said base being connected to an attached member;
   said top portion including an axial slot disposed to receive a section of line, said slot extending downwardly from and through said top portion toward said base and including: a downwardly directed line-loading section; an upwardly directed securement section in open communication therewith, said securement section terminating in a closed end; and, a transition section that interconnects said line loading section and said securement section
   a plurality of axially spaced annular grooves formed in the periphery of said top portion including a set groove disposed above said closed end of the securement section, a slip groove disposed intermediate the ends of the securement section, and a line loading groove disposed below the securement section; and
   a resilient ring disposed to be selectively received in one of said grooves.

2. The line tie of claim 1 wherein said attached member is a float.

3. The line tie of claim 2 wherein said attached member is a fishing float.

4. The line tie of claim 1 wherein said cylindrical section is formed of a resilient material, such that the slot is pinched toward a closed position when the resilient ring is received in the restraining groove.

5. The line tie of claim 1 wherein said axial slot includes a horizontal section that interconnects said line-loading section and said securement section.

6. The line tie of claim 1 wherein said annular grooves are separated by rounded annular protrusions.

7. The line tie of claim 6 wherein the annular protrusion separating the set groove from the slip groove includes opposing flats, whereby the movement of the resilient ring between the set groove and the slip groove is facilitated.

8. The line tie of claim 6 further including a rounded annular protrusion disposed above said set groove.

9. The line tie of claim 6 further including a rounded annular protrusion disposed below said line-loading groove.

10. The line tie of claim 1 wherein the resilient ring is a rubber O-ring.

* * * * *